(12) United States Patent
Kamikawa et al.

(10) Patent No.: US 9,163,879 B2
(45) Date of Patent: Oct. 20, 2015

(54) PARTIALLY-REDUCED IRON PRODUCING APPARATUS

(71) Applicant: MITSUBISHI-HITACHI METALS MACHINERY, INC., Tokyo (JP)

(72) Inventors: Susumu Kamikawa, Hiroshima (JP); Hideaki Mizuki, Hiroshima (JP); Hideki Ito, Hiroshima (JP); Keiichi Sato, Hiroshima (JP); Khanhson Pham, Hiroshima (JP)

(73) Assignee: PRIMETALS TECHNOLOGIES JAPAN, LTD., Tokyo (JP)

( * ) Notice: Subject to any disclaimer, the term of this patent is extended or adjusted under 35 U.S.C. 154(b) by 152 days.

(21) Appl. No.: 14/032,980

(22) Filed: Sep. 20, 2013

(65) Prior Publication Data

US 2014/0084524 A1 Mar. 27, 2014

(30) Foreign Application Priority Data

Sep. 21, 2012 (JP) .................................. 2012-208658

(51) Int. Cl.
*F27D 17/00* (2006.01)
*C22B 1/20* (2006.01)
*C21B 13/00* (2006.01)

(52) U.S. Cl.
CPC .......... *F27D 17/001* (2013.01); *C21B 13/0053* (2013.01); *C22B 1/20* (2013.01); *F27D 17/008* (2013.01)

(58) Field of Classification Search
CPC .. F27D 17/001; F27D 17/008; C21B 13/0053

USPC .......................................... 266/171, 176, 144
See application file for complete search history.

(56) References Cited

U.S. PATENT DOCUMENTS

| | | | |
|---|---|---|---|
| 5,951,740 A | 9/1999 | Sarma et al. | |
| 2002/0005089 A1* | 1/2002 | Nagata et al. | 75/433 |
| 2011/0143291 A1* | 6/2011 | Clements et al. | 431/9 |
| 2014/0084524 A1* | 3/2014 | Kamikawa et al. | 266/144 |

FOREIGN PATENT DOCUMENTS

| | | |
|---|---|---|
| JP | 45-39331 | 2/1970 |
| JP | 8-9739 B2 | 1/1996 |
| JP | 1211624 A | 3/1999 |
| JP | 2005-97645 A | 4/2005 |
| JP | 2011-236472 A | 11/2011 |

OTHER PUBLICATIONS

Chinese Official Action dated Dec. 22, 2014 for Chinese Application No. 201410424677.3.

* cited by examiner

*Primary Examiner* — Scott Kastler
(74) *Attorney, Agent, or Firm* — Birch, Stewart, Kolasch & Birch, LLP

(57) ABSTRACT

A partially-reduced iron producing apparatus includes: an exhaust gas circulating device which supplies an oxygen-containing gas to raw-material pellets to be heated by a heat of ignition raw-material pellets, the oxygen-containing gas made by circulating part of an exhaust gas discharged from the raw-material pellets by use of the heat of the ignition raw-material pellets heated in a heating furnace and mixing the discharged exhaust gas with air; and a liquid-tar separating device which is provided in the exhaust gas circulating device and which separates a tar component in the exhaust gas from the exhaust gas as a liquid tar.

6 Claims, 3 Drawing Sheets

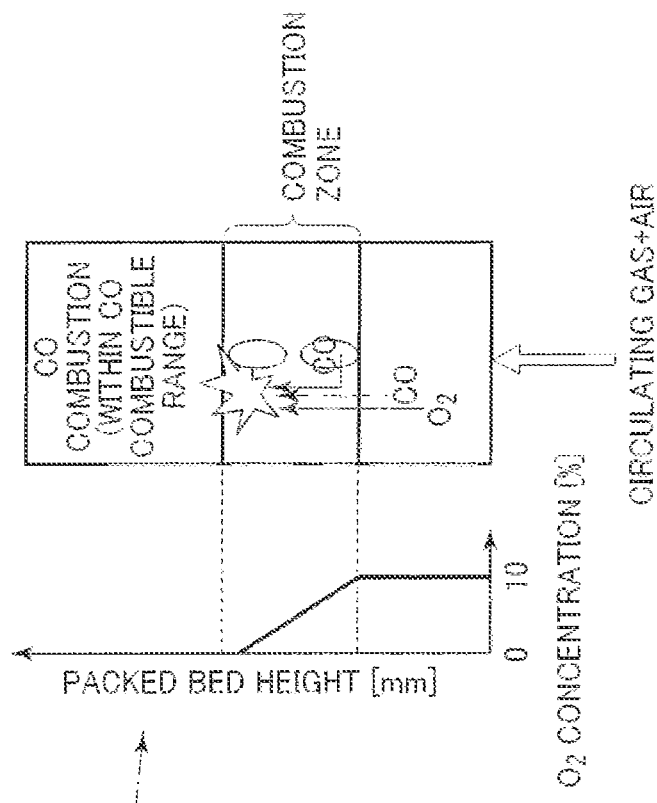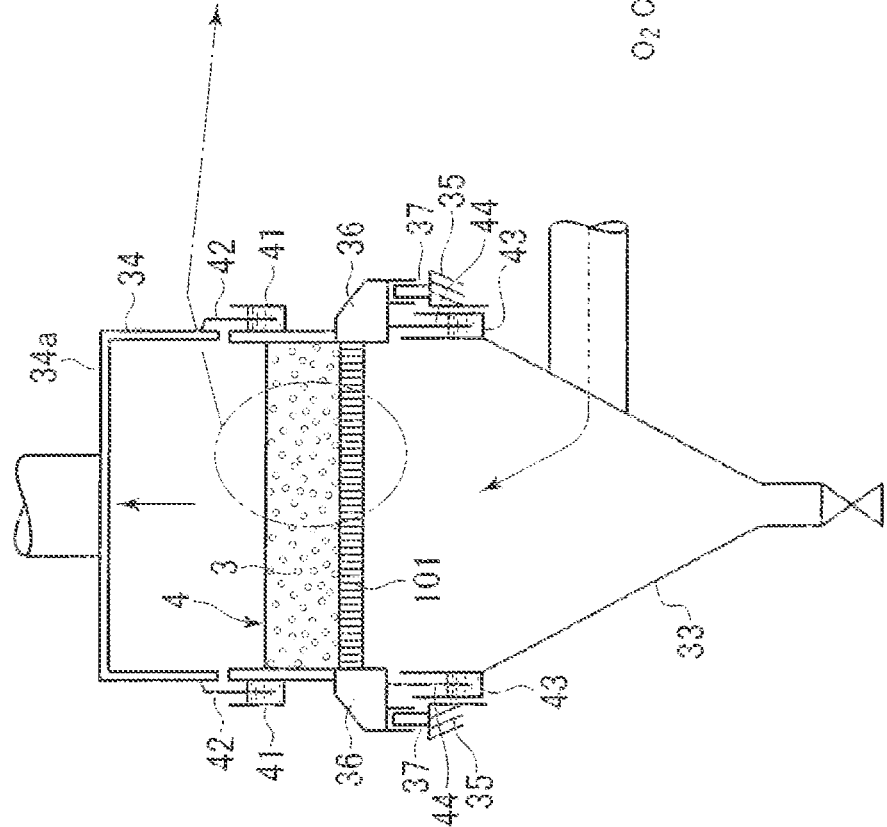

PARTIALLY-REDUCED IRON PRODUCING APPARATUS

BACKGROUND OF THE INVENTION

1. Field of the Invention

The present invention relates to a partially-reduced iron producing apparatus for producing a partially-reduced iron by reducing agglomerates containing an iron oxide.

2. Description of the Related Art

For example, Patent Literature 1 listed below discloses a conventional technique of producing a partially-reduced iron by packing carbon composite pellets on a moving grate and heating and reducing the pellets, the carbon composite pellets not being added with a combustion carbon material.

However, the technique described in Patent Literature 1 has the following problems and a partially-reduced iron with a high degree of reduction cannot be obtained.

(1) After being dried, the carbon composite pellets are ignited with a gas torch and air is made to flow therethrough to combust and heat the carbon composite pellets. Accordingly, a portion of a packed bed of the carbon composite pellets on a side from which air enters keeps on combusting and reduction dose not proceed in this portion. Moreover, even if the reduction proceeds, the carbon composite pellets are reoxidized by air and thus the degree of reduction does not increase at all. Furthermore, since a high temperature state is maintained, a molten slag is excessively generated and an operation may thereby become difficult in some cases.

(2) The pellets having moved out of a carbonization area are heated by a high-temperature inert gas whose oxygen concentration is equal to 5% or less and metallization proceeds by using a remaining portion of carbonaceous material. However, the amount of remaining carbon is small and the degree of metallization is low. Moreover, until a lower portion of the packed bed reaches a high temperature, an upper portion of the packed bed is exposed to strong oxidizing gases such as carbon dioxide and water vapor generated from the high-temperature carbonaceous material and reoxidation of the upper portion thereby proceeds.

(3) A high-temperature gas in a metallization area where a large amount of heat is required is produced by combusting part of a flammable volatile component in the coal which is generated in the carbonization area and a CO gas which is generated by the reduction reaction. However, since the amount of flammable component is small with respect to the amount of the entire exhaust gas, a supplemental fuel is additionally required.

In view of the problems described above, for example, Patent Literatures 2 and 3 listed below each disclose a conventional technique of producing partially-reduced iron in which pellets formed by mixing and pelletizing a reduction carbon material, a fine iron ore, and a slag-forming flux are added with a combustion carbon material by coating the pellets with the combustion carbon material, the combustion carbon material is ignited, and then the pellets are subject to sintering with air being suctioned downward.

CITATION ON LIST

Patent Literature

Patent Literature 1: Japanese Examined Patent Application Publication No. Sho 45-39331

Patent Literature 2: Japanese Examined Patent Application Publication No. Hei 8-9739

Patent Literature 3: Japanese Patent Application Publication No. 2005-97645

Patent Literature 4: Japanese Patent Application Publication No. 2011-236472(see paragraphs [0023], [0027], [0034], FIGS. 1 and 3, and the like for example)

SUMMARY OF THE INVENTION

Technical Problem

However, the conventional methods for producing the partially-reduced iron which are described in aforementioned Patent Literatures 2 and 3 have the following problems. First, since the added combustion carbon material combusts first, carbon monoxide and the flammable volatile component in coal which are generated from the heated pellets hardly combust and are discharged from the packed bed without being effectively used. Accordingly, the unit fuel consumption increases and $CO_2$ emissions thereby increase. Moreover, since the combustion carbon material continues to combust until there is no carbon component left therein, the cooling speed of the pellets is slow and metal iron in the reduced pellets is in contact with air in a high temperature state for a long period. Hence, reoxidation proceeds and the degree of metallization is low. In other words, in the conventional methods, the partially reduced iron is produced by igniting and combusting the raw-material pellets with the ignited combustion carbon material. This increases the production cost by an amount corresponding to the used combustion carbon material.

Moreover, in an apparatus for producing the partially-reduced iron described above, from the view point of an efficient use of energy, there is a demand to effectively utilize a flammable exhaust gas generated in a rotary hearth furnace which is an apparatus for producing the reduced iron. For example, Patent Literature 4 discloses a method for producing a reduced iron in which dust is removed from a hearth furnace exhaust gas generated in the rotary hearth furnace and then part of the hearth furnace exhaust gas is collected by a circulation duct and reused as part of fuel of a radiant tube burner. However, the method for producing the reduced iron disclosed in Patent Literature 4 has the following problem. In the method, adhesion of tar onto an exhaust duct is prevented by providing a tar decomposing catalyst in a gas outlet to combust the hearth furnace exhaust gas. Since the tar in the hearth furnace exhaust gas is combusted and removed by the tar decomposing catalyst, the tar component in the hearth furnace exhaust gas cannot be effectively used. Accordingly, there is a heat energy loss corresponding to this tar component.

The present invention has been made to solve the problems described above and an object thereof is to provide a partially-reduced iron producing apparatus which can produce the partially-reduced iron without using the combustion carbon material and which can suppress heat energy loss by effectively using the tar component in the exhaust gas.

Solution to Problem

A partially-reduced iron producing apparatus of the present invention which solves the problems described above comprises:
  ignition raw-material pellet supplying means for laying ignition raw-material pellets to a predetermined height on an endless grate, the ignition raw-material pellets made of the same material as that of raw-material pellets formed by mixing and pelletizing a reduction carbon material and a raw material containing iron oxide;

heating means for heating the ignition raw-material pellets laid on the endless grate to a reduction temperature range;

raw-material pellet supplying means for laying the raw-material pellets on the ignition raw-material pellets heated by the heating means;

exhaust gas circulating means for laying an oxygen-containing gas to the raw-material pellets to be heated by a heat of the ignition raw-material pellets, the oxygen-containing gas made by circulating part of an exhaust gas discharged from the raw-material pellets by use of the heat of the ignition raw-material pellets and mixing the discharged exhaust gas with air; and liquid-tar separating means, provided in the exhaust gas circulating means, for separating a tar component in the exhaust gas from the exhaust gas as a liquid tar, wherein a partially-reduced iron is produced by heating and reducing the whole of the raw-material pellets in a bed height direction thereof through a combustion region for the raw-material pellets and a heating region for the raw-material pellets, the combustion region formed on an upstream side in a travelling direction of the endless grate by supplying the oxygen-containing gas having a high oxygen concentration to the ignition raw-material pellets heated by the heating means, the heating region formed downstream of the combustion region for the raw-material pellets in the travelling direction of the endless grate by supplying the oxygen-containing gas having a low oxygen concentration to the raw-material pellets.

A partially-reduced iron producing apparatus of the present invention which solves the problems described above is the partially-reduced iron producing apparatus of the present invention described above in which the liquid-tar separating means has gas-liquid separating means for separating the liquid tar from the exhaust gas by cooling the exhaust gas to condense the tar component in the exhaust gas, and the gas-liquid separating means includes: a tower main body into which the exhaust gas flows; liquid-tar ejecting means for ejecting the liquid tar, in the tower main body; and liquid-tar feeding means for collecting liquid tar which is ejected from the liquid-tar ejecting means and liquid tar which is condensed from the tar component in the exhaust gas by the liquid tar ejected from the liquid-tar ejecting means, and feeding the liquid tar to the liquid tar ejecting means.

A partially-reduced iron producing apparatus of the present invention which solves the problems described above is the partially-reduced iron producing apparatus of the present invention described above in which the gas-liquid separating means further includes temperature adjusting means, provided in the liquid-tar feeding means, for adjusting the temperature of the liquid tar.

A cooler, a heater, and the like can be given as examples of the temperature adjusting means.

A partially-reduced iron producing apparatus of the present invention which solves the problems described above is the partially-reduced iron producing apparatus of the present invention described above in which two of the gas-liquid separating means are provided, and one of the gas-liquid separating means and the other gas liquid separating means are arranged in series.

A partially-reduced iron producing apparatus of the present invention which solves the problems described above is the partially-reduced iron producing apparatus of the present invention described above in which the liquid-tar separating means further includes mist-form tar separating means, provided in a stage subsequent to the gas-liquid separating means, for separating a mist-form tar in the exhaust gas from the exhaust gas.

A partially-reduced iron producing apparatus of the present invention which solves the problems described above is the partially-reduced iron producing apparatus of the present invention described above further comprising:

liquid-tar storing means, provided to be connected to the liquid-tar separating means, for storing the liquid tar separated by the liquid-tar separating means; and liquid-tar supplying means for supplying the liquid tar stored in the liquid-tar storing means to the heating means.

Advantageous Effects of the Invention

The partially-reduced iron producing apparatus of the present invention can produce the partially-reduced iron without using a combustion carbon material and can also suppress heat energy loss by effectively using the tar component in the exhaust gas.

BRIEF DESCRIPTION OF THE DRAWINGS

FIGS. 2A and 2B are explanatory diagrams of the main embodiment of the partially-reduced iron producing apparatus of the present invention, FIG. 2A showing cross-section of a reduction furnace included in the partially-reduced iron producing apparatus, FIG. 2B showing a relationship between an oxygen concentration and the height of a raw-material pellet packed bed in the reduction furnace.

DETAILED DESCRIPTION OF THE INVENTION

Figure 1:
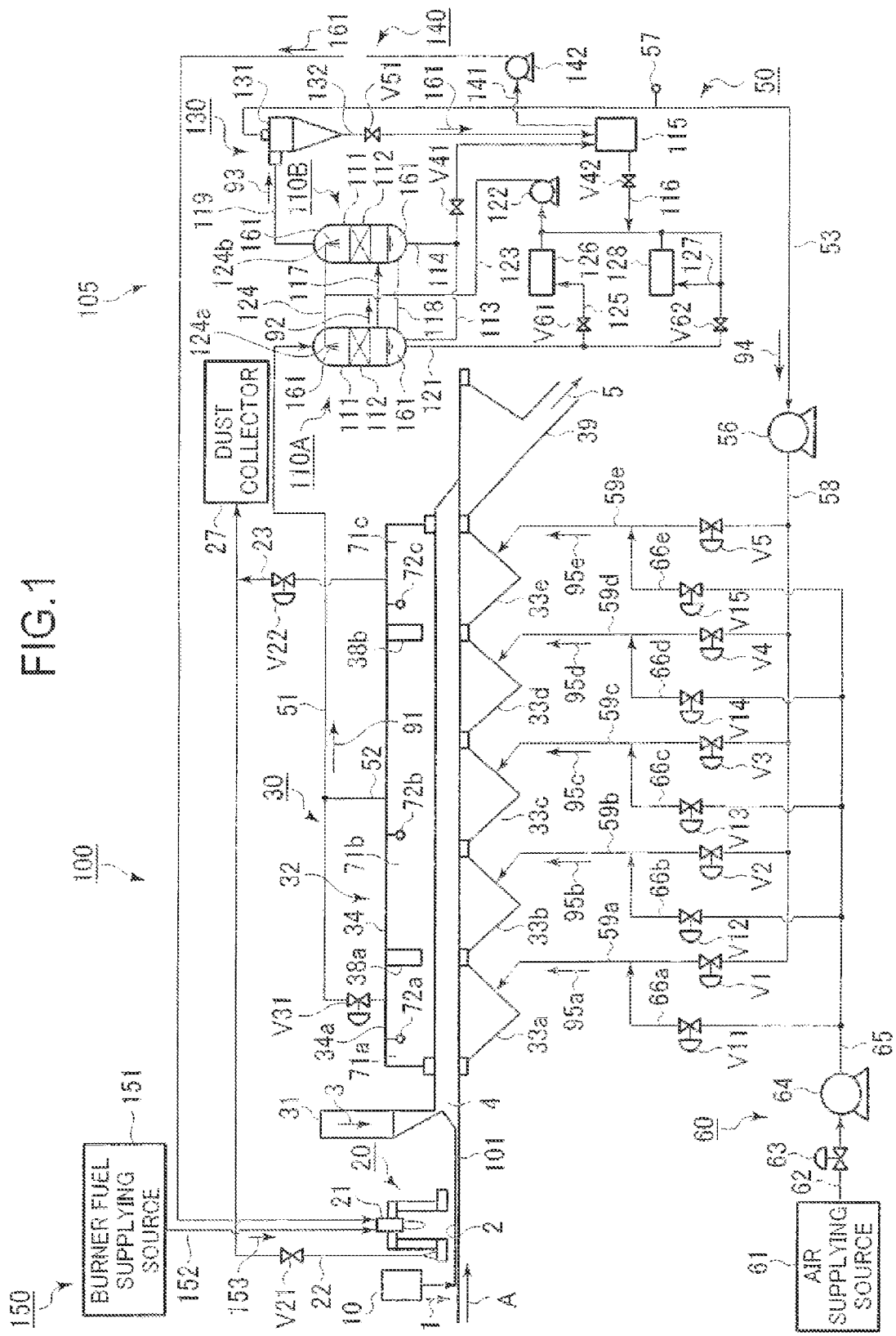
FIG. 1 is a schematic diagram showing a main embodiment of a partially-reduced iron producing apparatus of the present invention.

Embodiments of a partially-reduced iron producing apparatus of the present invention are described below. However, the present invention is not limited to the apparatus illustrated in the drawings.

Main Embodiment

Figure 3:
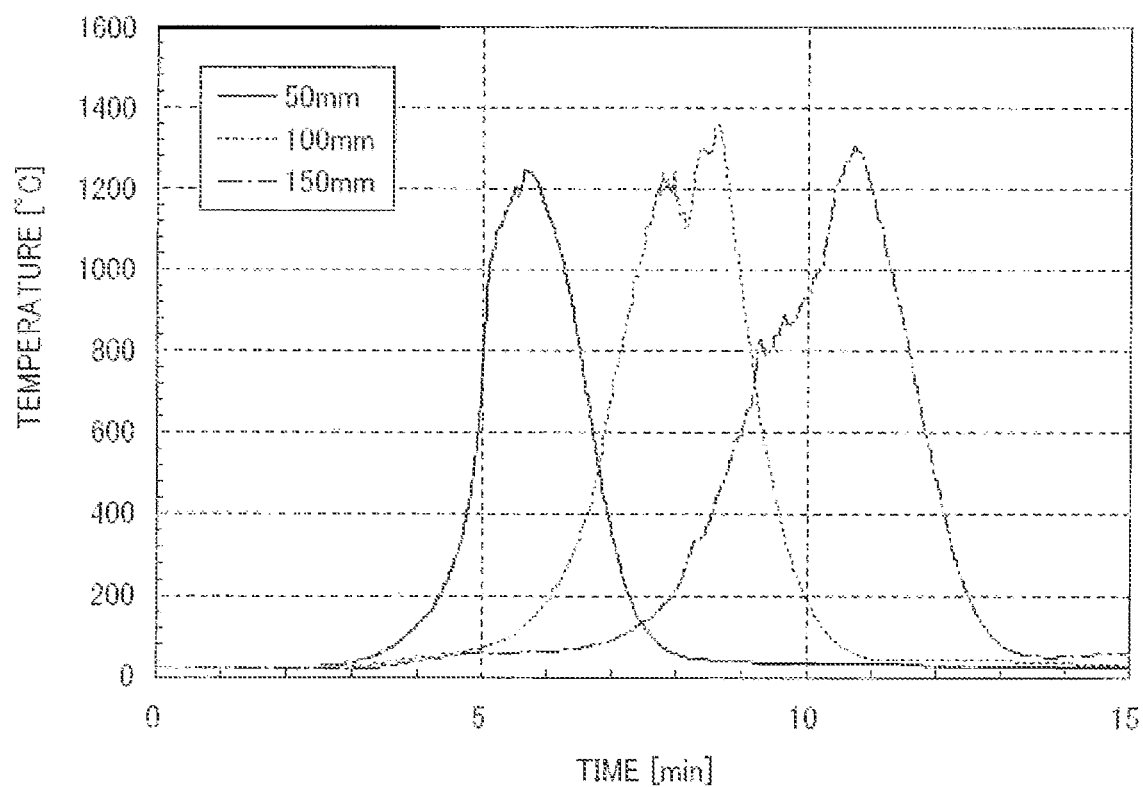
FIG. 3 is a graph showing an example of temperature change at positions away from a bottom surface of the packed bed in a bed height direction thereof in the reduction furnace included in the main embodiment of the partially-reduced iron producing apparatus of the present invention, the temperature change observed when the raw-material pellets are packed at the height of 200 mm in the reduction furnace and are heated while the mixed gas is vented upward.

A main embodiment of the partially-reduced iron producing apparatus of the present invention is described based on FIGS. 1 to 3. In FIG. 1, the arrow A shows a travelling direction of a grate.

As shown in FIGS. 1, 2A, and 2B, the partially-reduced iron producing apparatus of the embodiment includes a grate reduction furnace 100 of an upward suction type. The grate reduction furnace 100 includes an ignition raw-material pellet supplying device 10, a heating furnace 20, and a reduction furnace (partial reduction furnace) 30. These components are arranged from upstream in the travelling direction of a grate (endless grate) 101 in the order of description.

The ignition raw-material pellet supplying device 10 is a device which supplies ignition raw-material pellets 1 onto the grate 101 and lays the ignition raw-material pellets 1 to a predetermined height. In other words, the ignition raw-material pellet supplying device 10 forms raw-material pellet supplying means. The ignition raw-material pellets 1 are made of the same material as that of raw-material pellets 3 to be described later in detail and form part of the raw-material pellets 3. The bed height of the ignition raw-material pellets 1 is such a height that the after-mentioned raw-material pellets 3 laid on an ignition raw-material pellet bed 2 can be ignited, and is, for example, higher than 5 mm and lower than 20 mm, preferably higher than 5 mm and 10 mm or less. When the bed height of the ignition raw-material pellet bed 2 is equal to or lower than 5 mm, the amount of heat generated by the ignition raw-material pellets 1 is so small as to be insufficient for generation of a flammable volatile component from a reduction carbon material in the raw-material pellets 3. Meanwhile, when the bed height is 20 mm or higher, the pellets in a lowermost layer are poorly heated and some of the pellets are not reduced.

The heating furnace 20 includes a combustion burner 21 which heats the ignition raw-material pellet bed 2 (ignition raw-material pellets 1) supplied onto the grate 101 to a reduction temperature range. In other words, the heating furnace 20 forms heating means whose interior temperature can be controlled. The heating furnace 20 has such a length that the heated ignition raw-material pellet bed 2 can be heated to a predetermined temperature. The heating furnace 20 also includes a combustion gas exhaust pipe 22. The combustion gas exhaust pipe 22 is provided with a valve V21. A rear end portion of the combustion gas exhaust pipe 22 is connected to a dust collector 27. Accordingly, a combustion gas generated when the ignition raw-material pellet bed 2 is heated by the combustion burner 21 is exhausted to the outside of a system through the combustion gas exhaust pipe 22 and the dust collector 27.

The heating furnace 20 includes a burner fuel supplying device 150 configured to supply a burner fuel to the combustion burner 21. The burner fuel supplying device 150 includes a burner fuel supplying source 151 and a burner fuel supplying pipe 152 whose one end portion is connected to the burner fuel supplying source 151 and whose other end portion is connected to the burner 21. The burner fuel 153 can be thus supplied to the burner 21. Examples of the burner fuel 153 include natural gas, an exhaust gas which mainly includes carbon monoxide gas and which is generated in a melting furnace installed downstream of the reduction furnace 100, and the like. An example of the combustion burner 21 includes a mixed-combustion burner which can combust liquid tar 161 to be described later in detail and the burner fuel such as the natural gas and the exhaust gas generated in the melting furnace.

The reduction furnace 30 is a device which produces an agglomerate-like partially-reduced iron 5 by reducing the raw-material pellets 3 and has an annular shape as a whole. The reduction furnace 30 includes a raw-material pellet supplying device 31, a reduction furnace main body 32, and a partially-reduced iron discharging device 39 which are arranged in this order from upstream in the travelling direction of the grate 101. The raw-material pellet supplying device (feed hopper) 31 is a device which supplies the raw-material pellets 3 onto the ignition raw-material pellet bed 2. The raw-material pellet supplying device 31 not only supplies the raw-material pellets 3 onto the ignition raw-material pellet bed 2, but also adjusts the height of a raw-material pellet packed bed 4, which is formed by packing the raw-material pellets 3, to a predetermined height. The raw-material pellets 3 are a raw material for the partially-reduced iron to be eventually produced and are formed by mixing and pelletizing a raw material containing iron oxide, the reduction carbon material, and a lime-based slag-forming flux and then coating the resultant object with an anti-oxidant. For example, the raw-material pellets 3 each contain coal by about 20% of its total amount and the amount of the flammable volatile component in the coal is 20% or more.

The reduction furnace main body 32 described above includes a wind box 33, an annular hood 34, and tracks 35, 35. The wind box 33 is installed below the grate 101 and is a fixed structure. The hood 34 is installed above the wind box 33 with the grate 101 interposed therebetween and is a fixed structure. The tracks 35, 35 are laid in an annular shape on both sides of the wind box 33.

The aforementioned wind box 33 includes multiple wind boxes depending on the diameter of the grate, such as a first wind box 33a, a second wind box 33b, a third wind box 33c, a fourth wind box 33d, and a fifth wind box 33e which are arranged in this order from the raw-material pellet supplying device 31 side in the travelling direction of the grate 101.

Two partition boards 38a and 38b are provided on a ceiling plate 34a of the aforementioned hood 34 and three regions 71a, 71b, and 71c are thus defined in the travelling direction A of the grate 101. The first partition board 38a is disposed at such a position as to define a space (ignition region 71a to be described later) above the first wind box 33a and a space (reduction region 71b to be described later) above the second wind box 33b. The second partition board 38b is disposed at such a position as to define a space (reduction region 71b to be described later) above the fourth wind box 33d and a space (cooling region 71c to he described later) above the fifth wind box 33e. Temperature sensors 72a, 72b, and 72c are provided respectively in the ignition region (ignition raw-material pellet combustion region) 71a, the reduction region (raw-material pellet heating region) 71b, and the cooling region (raw-material pellet cooling region) 71c.

The grate 101 is porous and is configured such that a gaseous body can pass therethrough in a vertical direction but the ignition raw-material pellets 1 and the raw-material pellets 3 cannot. The grate 101 is divided into multiple units and the annular grate 101 is formed by arranging these units in a circumferential direction. Each of the divided units is tiltably attached to annular supporting portions 36, 36 provided respectively on both sides of the grate 101. The supporting portions 36, 36 are provided with rollers 37, 37 configured to travel on the tracks 35, 35. Causing the rollers 37, 37 to travel on the tracks 35, 35 allows the grate 101 to horizontally circulate in a space between the wind box 33 and the hood 34.

Water seal boxes 41, 41 filled with water are annularly provided in upper portions of the supporting portions 36, 36 of the grate 101, along the entire peripheries thereof. Seal plates 42, 42 extending downward are annularly provided in lower portions of the hood 34 on both sides, along the entire peripheries thereof. Lower end portions of the seal plates 42, 42 are submerged in a liquid in the water seal boxes 41, 41. Hence, spaces between the supporting portions 36, 36 of the grate 101 and the lower portions of the hood 34 on both sides are sealed in an air-tight manner. In other words, the water seal boxes 41 and the seal plates 42 form a water seal device above the grate.

Meanwhile, water seal boxes 43, 43 filled with water are annularly provided in upper portions of the wind box 33 on both sides, along the entire peripheries thereof. Seal plates 44, 44 extending downward are annularly provided in lower portions of the supporting portions 36, 36 of the grate 101, along the entire peripheries thereof. Lower end portions of the seal plates 44, 44 are submerged in a liquid in the water seal boxes

43, 43. Hence, spaces between the supporting portions 36, 36 of the grate 101 and the upper portions of the wind box 33 on both sides are sealed in an air-tight manner. In other words, the water seal boxes 43 and the seal plates 44 form a water seal device below the grate.

A cooling region gas exhaust pipe 23 is provided to communicate with the hood 34 forming the cooling region 71c. The cooling region gas exhaust pipe 23 communicates with the aforementioned combustion gas exhaust pipe 22. A flow rate adjusting valve V22 is provided in the cooling region gas exhaust pipe 23 and the discharge amount of gas in the cooling region can be thereby adjusted.

The aforementioned reduction furnace 30 further includes an exhaust gas circulating device (exhaust gas circulating means) 50 which discharges an exhaust gas 91 from the ignition region 71a surrounded by the grate 101, the hood 34, and the first partition board 38a and from the reduction region 71b surrounded by the grate 101, the hood 34, the first partition board 38a, and the second partition board 38b, separates a tar component from the exhaust gas 91 by using a liquid-tar separating device 105 to be described later, supplies a tar-component-processed exhaust gas 94 from which the tar component is separated to the wind boxes 33a to 33e, and thereby circulates the tar-component-processed exhaust gas 94. The exhaust gas circulating device 50 includes a first exhaust pipe 51, a second exhaust pipe 52, a gas delivery pipe 53, a pump 56, a circulating gas delivery pipe 58, and first to fifth branch circulating gas delivery pipes 59a to 59e.

One end portion of the first exhaust pipe 51 communicates with the hood 34 forming the ignition region 71a and the other end portion thereof is connected to an upper portion of a tower main body 111 of a first gas cooling tower 110A, described later in detail, of the liquid-tar separating device 105. An on-off valve V31 is provided in the first exhaust pipe 51. One end portion of the second exhaust pipe 52 communicates with the hood 34 forming the reduction region 71b and the other end portion thereof communicates with an intermediate portion of the first exhaust pipe 51. With this configuration, the exhaust gas 91 in the ignition region 71a and the reduction region 71b is delivered to the first gas cooling tower 110A through the first exhaust pipe 51 and the second exhaust pipe 52. The tower main body 111 of the first gas cooling tower 110A is connected to a tower main body 111 of a second gas cooling tower 110B to be described later in detail, via a first-cooled exhaust gas delivery pipe 117. The exhaust gas 91 is cooled in the tower main body 111 of the first gas cooling tower 110A to become a first-cooled exhaust gas 92 and the first-cooled exhaust gas 92 is delivered to the tower main body 111 of the second gas cooling tower 110B through the first-cooled exhaust gas delivery pipe 117. The tower main body 111 of the second gas cooling tower 110B is connected to a mist-form tar separating device 130 to be described later in detail, via a communication pipe 119. The first-cooled exhaust gas 92 is cooled in the second gas cooling tower 110B to become a second-cooled exhaust gas 93 and the second-cooled exhaust gas 93 is delivered to the mist-form tar separating device 130 through the communication pipe 119. The mist-form tar separating device 130 is connected to the pump 56 via the gas delivery pipe 53. The second-cooled exhaust gas 93 is processed in the mist-form tar separating device 130 to become the tar-component-processed exhaust gas 94 and the tar-component-processed exhaust gas 94 is delivered to the pump 56 through the gas delivery pipe 53. An $O_2$ sensor (oxygen concentration detecting means) 57 configured to measure the oxygen concentration in the tar-component-processed exhaust gas 94 is provided in an intermediate portion of the gas delivery pipe 53. One end portion of the circulating gas delivery pipe 58 is connected to the pump 56 and the other end portion thereof branches into the first to fifth branch circulating gas delivery pipes 59a to 59e. The first to fifth branch circulating gas delivery pipes 59a to 59e communicate respectively with the first to fifth wind boxes 33a to 33e. The first to fifth branch circulating gas delivery pipes 59a to 59e are respectively provided with flow rate adjusting valves (circulating exhaust gas flow rate adjusting means) V1 to V5.

The aforementioned reduction furnace main body 32 further includes an air supplying device 60 which is connected to the first to fifth branch circulating gas delivery pipes 59a to 59e of the aforementioned exhaust gas circulating device 50 and which forms air supplying means (oxygen supplying means) for supplying air to the first to fifth branch circulating gas delivery pipes 59a to 59e. The air supplying device 60 includes an air supplying source 61, an air feed pipe 62 whose one end portion is connected to the air supplying source 61, a flow rate adjusting valve 63 which is provided in an intermediate portion of the air feed pipe 62, a pump 64 to which the other end portion of the air feed pipe 62 is connected, and an air delivery pipe 65. One end portion of the air delivery pipe 65 is connected to the pump 64 and the other end portion thereof branches into first to fifth branch air delivery pipes 66a to 66e communicating respectively with the first to fifth branch circulating gas delivery pipes 59a to 59e. The first to fifth branch air delivery pipes 66a to 66e are provided respectively with flow rate adjusting valves V11 to V15 forming air flow rate adjusting means (oxygen flow rate adjusting means) for adjusting the flow rate of air.

With the above configuration, gases (oxygen-containing gases) 95a to 95e containing oxygen and carbon monoxide whose concentrations are adjusted to desired levels can be supplied to the wind boxes 33a to 33e, respectively, by adjusting the opening degree of each of the flow rate adjusting valves V1 to V5 and the flow rate adjusting valves V11 to V15, based on the oxygen concentration measured by the $O_2$ sensor 57 and the temperatures measured by the temperature sensors 72a to 72c. In other words, the oxygen concentration can be adjusted to the desired level in each of the ignition region 71a, the reduction region 71b, and the cooling region 71c.

The partially-reduced iron discharging device 39 is a device which discharges, from the grate 101, the partially-reduced iron 5 having been produced while passing through the regions 71a to 71c described above.

The partially-reduced iron producing apparatus described above further includes the liquid-tar separating device 105 which is provided in the exhaust gas circulating device 50 and which separates the tar component being a flammable component in the exhaust gases 91, 92, and 93 as liquid tar. The liquid-tar separating device 105 includes gas cooling towers which form gas-liquid separating means and which separate the liquid tar from the exhaust gases 91, 92 by cooling the exhaust gases 91, 92 to condense the tar component in the exhaust gases 91, 92. The gas cooling towers include the first gas cooling tower 110A and a second gas cooling tower 110B provided in series with the first gas cooling tower 110A.

The first gas cooling tower 110A includes: the tower main body 111 into which the exhaust gas 91 flows from the upper portion through the first exhaust pipe 51; a tar-component condensation promoting unit 112 which is provided in the tower main body 111 and which promotes condensation of the tar component in the exhaust gas 91; and a liquid-tar ejection pipe (liquid-tar ejecting means) 124 which is provided with an ejection hole 124a for ejecting the liquid tar 161 into the tower main body 111. Examples of the tar-component condensation promoting unit 112 include multiple flat plate and wave-shaped plates through which the exhaust gas 91 and the liquid tar 161 can flow and which are arranged to extend, for example, in the vertical direction. One end portion of a liquid-tar circulation pipe 121 is connected to a lower portion of the tower main body 111. The other end portion of the liquid-tar circulation pipe 121 is connected to a liquid-tar feed pipe 123 via a circulation pump 122. A first liquid-tar branch pipe 125 is provided in the liquid-tar circulation pipe 121 and a heater switching valve V61 and a heater 126 are provided in an intermediate portion of the first liquid-tar branch pipe 125. The one end portion of the first liquid-tar branch pipe 125 is connected to a portion of the liquid-tar circulation pipe 121 near the circulation pump 122. Setting the heater switching valve V61 to an open state allows the liquid tar 161 to flow to the circulation pump 122 through the first liquid-tar branch pipe 125 and the heater 126. The liquid-tar circulation pipe 121 is provided with a second liquid-tar branch pipe 127, and a cooler (cooling unit) 128 is provided in an intermediate portion of the second liquid-tar branch pipe 127. A cooler switching valve V62 is provided in a portion of the liquid-tar circulation pipe 121 near one end portion of the second liquid-tar branch pipe 127. The other end portion of the second liquid-tar branch pipe 127 is connected to a portion near the connection portion in the liquid-tar circulation pipe 121 between the liquid-tar circulation pipe 121 and an in-tank liquid-tar feed pipe 116 to be described later. Setting the cooler switching valve V62 to an open state allows part of the liquid tar to flow to the circulation pump 122 through the second liquid-tar branch pipe 127 and the cooler 128.

The liquid-tar feed pipe 123 is connected to the liquid-tar ejection pipe 124. The liquid tar 161 in the tower main body 111 is fed to the liquid-tar ejection pipe 124 via the liquid-tar circulation pipe 121, the circulation pump 122, and the liquid-tar feed pipe 123. Specifically, the liquid-tar 161 ejected into the tower main body 111 of the first gas cooling tower 110A from the ejection hole 124a provided in one end portion of the liquid-tar ejection pipe 124 is circulated to the liquid-tar ejection pipe 124 via the liquid-tar circulation pipe 121, the circulation pump 122, and the liquid-tar feed pipe 123. Moreover, ejecting the liquid tar 161 from the liquid-tar ejection pipe 124 brings the liquid tar 161 in contact with the exhaust gas 91 and cools the exhaust gas 91. The tar component in the exhaust gas 91 thereby condenses into the liquid tar 161 and is separated from the exhaust gas 91. In summary, the liquid-tar circulation pipe 121, the circulation pump 122, and the liquid-tar feed pipe 123 form liquid-tar feeding means which collects the liquid-tar 161 ejected from the liquid-tar ejection pipe 124 and the liquid-tar 161 obtained by condensing the tar component in the exhaust gas 91 by using the liquid-tar 161 ejected from the liquid-tar ejection pipe 124 and which feeds the collected liquid-tar 161 to the liquid-tar ejection pipe 124.

The first gas cooling tower 110A is connected to the second gas cooling tower 110B via the aforementioned first-cooled exhaust gas delivery pipe 117, and is also connected to the second gas cooling tower 110B via a liquid-tar communication pipe 118. A liquid level sensor (not illustrated) configured to detect that the liquid level of the liquid tar 161 is within a predetermined height range is provided in the tower main body 111 of the first gas cooling tower 110A. The first-cooled exhaust gas delivery pipe 117 is located below the tar-component condensation promoting unit 112 of the first gas cooling tower 110A and above the liquid level of the liquid tar 161 in the tower main body 111 of the first gas cooling tower 110A. The liquid-tar communication pipe 118 is located near a bottom portion of the tower main body 111 of the first gas cooling tower 110A and below the liquid level of the liquid tar 161 in the tower main body 111 of the first gas cooling tower 110A. Moreover, one end portion of a liquid-tar discharge pipe 113 for discharging the liquid tar 161 in the tower main body 111 of the first gas cooling tower 110A is connected the bottom portion of the first gas cooling tower 110A. The other end portion of the liquid-tar discharge pipe 113 is connected to a liquid-tar storage tank 115. An on-off valve V41 is provided in an intermediate portion of the liquid-tar discharge pipe 113. The liquid-tar storage tank 115 is connected no the liquid-tar circulation pipe 121 via the in-tank liquid-tar feed pipe 116. An on-off valve V42 is provided in an intermediate portion of the in-tank liquid-tar feed pipe 116.

The second gas cooling tower 110B is provided in series with the first gas cooling tower 110A and has substantially the same configuration as the first gas cooling tower 110A. The second gas cooling tower 110B includes: the tower main body 111 into which the first-cooled exhaust gas 92 flows from a side portion through the first-cooled exhaust gas delivery pipe 117; a tar-component condensation promoting unit 112 which is provided in the tower main body 111 and which promotes condensation of the tar component in the first-cooled exhaust gas 92; and the liquid-tar ejection pipe 124 which ejects the liquid tar 161 into the tower main body 111. The first-cooled exhaust gas delivery pipe 117 is connected to the tower main body 111 of the second gas cooling tower 110B at a position below the tar-component condensation promoting unit 112 and above the liquid level of the liquid tar 161 in the tower main body 111. Moreover, the liquid-tar communication pipe 118 is connected to the tower main body 111 of the second gas cooling tower 110B at a position near a bottom portion of the tower main body 111 and below the liquid surface of the liquid tar 161. The liquid tar 161 ejected into the tower main body 111 of the second gas cooling tower 110B from an ejection hole 124b provided in the other end portion of the liquid-tar ejection pipe 124 is circulated to the liquid-tar ejection pipe 124 via the liquid-tar communication pipe 118, the tower main body 111 of the first gas cooling tower 110A, the liquid-tar circulation pipe 121, the circulation pump 122, and the liquid-tar feed pipe 123. Thus, the liquid tar 161 in the first gas cooling tower 110A and the liquid tar 161 in the second gas cooling tower 110B are adjusted to be at substantially the same height. Moreover, one end portion of a liquid-tar discharge pipe 114 is connected to a bottom portion of the tower main body 111 of the second gas cooling tower 110B. The other end portion of the liquid-tar discharge pipe 114 is connected to the liquid-tar discharge pipe 113. One end portion of the communication pipe 119 is connected to a ceiling portion of the second gas cooling tower 110B and the other end portion of the communication pipe 119 is connected to a device main body 131 of the mist-form tar separating device 130.

The tower main body 111 of the first gas cooling tower 110A, the tower main body 111 of the second gas cooling tower 110B, the liquid-tar discharge pipes 113, 114, the liquid-tar storage tank 115, the liquid-tar circulation pipe 121, the liquid-tar feed pipe 123, the liquid-tar ejection pipe 124, the liquid-tar communication pipe 118, and the liquid-tar storage tank 115 are provided with heat-retaining heaters (not illustrated). Accordingly, the flowability of the liquid tar 161 can be secured in the start-up of the partially-reduced iron producing apparatus by heating the liquid tar 161 to a predetermined temperature (for example, 50° C. to 80° C.). Note that the heat-retaining heaters, the heater 126, the cooler 128, and the like form temperature adjusting means for adjusting the temperature of the liquid tar.

The aforementioned liquid-tar separating device 105 is provided in a stage subsequent to the second gas cooling tower 110B of the aforementioned gas cooling towers and further includes the mist-form tar separating device 130 forming mist-form tar component separating means for separating mist-form tar in the exhaust gas 93 from the exhaust gas 93. The mist-form tar separating device 130 is a cyclone mist separator. For example, the mist-form tar separating device 130 can collect particles of liquid tar having a diameter of several micro meters. The device main body 131 of the mist-form tar separating device 130 is connected to the liquid-tar storage tank 115 via a liquid-tar discharge pipe 132. An on-off valve V51 is provided in an intermediate portion of the liquid-tar discharge pipe 132. Accordingly, when a predetermined amount of the liquid tar separated by the mist-form tar separating device 130 is accumulated and the on-off valve V51 is set to an open state, the liquid tar 161 accumulated in the mist-form tar separating device 130 can be fed to the liquid-tar storage tank 115.

The partially reduced iron producing apparatus described above further includes a liquid-tar supplying device (liquid-tar feeding means) 140 configured to supply the liquid tar accumulated in the liquid-tar storage tank 115 to the combustion burner 21 of the heating furnace 20. The liquid-tar supplying device 140 includes: a liquid-tar supplying pipe 141 whose one end portion is connected to the liquid-tar storage tank 115 and whose other end portion is connected to the burner 21; and a liquid-tar supplying pump 142 provided in an intermediate portion of the liquid-tar supplying pipe 141. The liquid tar 161 in the liquid-tar storage tank 115 can be supplied to the combustion burner 21 by driving the liquid-tar supplying pump 142. The mixed combustion burner is used as the combustion burner 21 and the amount of liquid tar in the liquid-tar storage tank 115 is maintained to be constant by combusting a constant amount of the liquid tar 161 and combusting burner fuel 153 for shortfall.

The partially-reduced iron producing apparatus described above includes a control device (not illustrated) configured to control the aforementioned furnaces 20, 30, the aforementioned devices 10, 50, 60, 105, 140, 150, the valves 63, V1 to V5, V11 to V15, V21, V22, V31, V41, V42, V51, V61, V62, and the like.

Description is given of a procedure of producing the partially-reduced iron by using the partially-reduced-iron producing apparatus having the aforementioned configuration.

First, the ignition raw-material pellet supplying device 10 supplies the ignition raw-material pellets 1 onto the grate 101. At this time, the height of the ignition raw-material pellet bed 2 is adjusted to be within a range of 5 mm to 10 mm, for example. Then, the grate 101 moves forward and the burner 21 heats the ignition raw-material pellet bed 2 to the reduction temperature range which is, for example, about 1200° C. Next, the grate 101 moves forward and the raw-material pellets 3 are supplied onto the ignition raw-material pellet bed 2 from the raw-material pellet supplying device 31. The height of the raw-material pellet packed bed 4 made of the raw-material pellets 3 is adjusted to about 200 mm, for example. Subsequently, the grate 101 moves forward and mixed gases of the circulated gas and air are vented into the hood 34. The mixed gas 95a whose oxygen concentration is adjusted to 15% is vented into the first wind box 33a. This causes the raw-material pellets 3 adjacent to the heated ignition raw-material pellets 1 to be heated by the heated ignition raw-material pellets 1 in the ignition raw-material pellet combustion region 71a. The flammable volatile components are thus generated from the heated raw-material pellets 3 and are combusted. The raw-material pellet packed bed 4 on the ignition raw-material pellet bed 2 is heated by the heat of this combustion.

The grate 101 further moves forward and the mixed gases 95b to 95d whose oxygen concentrations are adjusted to 11% are vented into the second to fourth wind boxes 33b to 33d. Due to this, the following phenomena occur in the raw-material pellet packed bed 4, which is heated by the ignition raw-material pellet bed 2, in the reduction region 71b above the second to fourth wind boxes 33b to 33d. The flammable volatile component is generated from the reduction carbon material in the raw-material pellets 3 and about 75% to 90% of the flammable volatile component is combusted. This combustion of the flammable volatile component further increases the temperature of the raw-material pellets 3 and the reductive reaction proceeds. A carbon monoxide gas is thereby generated and part of the generated gas is combusted. As a result, high concentration of carbon monoxide, which is about 8%, for example, is generated in a center portion of the inside of the hood 34 in the grate travelling direction. Meanwhile, the combustion of the carbon monoxide gas heats the raw-material pellets 3 adjacent thereto and the flammable volatile component is generated from the reduction carbon material in the adjacent raw-material pellets 3. The mixed gases 95b to 95d (oxygen containing gases), which are made by circulating a remaining portion of the flammable volatile component and the carbon monoxide gas and mixing them with air, are supplied to the raw-material pellets 3 whose temperature has increased. As shown in FIG. 2B, this causes the carbon monoxide gas in the mixed gases 95b to 95d to be added to the carbon monoxide gas generated due to the reduction. As a result, the concentration of the carbon monoxide gas near the raw-material pellets 3 is increased to a level within the combustion range (12% or more) of the carbon monoxide gas and about 50% to 60% of the entire carbon monoxide gas is combusted, thereby increasing the temperature. This forms a combustion zone of a temperature required for the reduction of partially-reduced iron. In other words, the reduction proceeds in such a way that the carbon in the reduction carbon material in the raw-material pellets 3 turns into gas and carbon monoxide is thus generated and bonded with oxygen in the raw material containing iron oxide. The gas 91 in the reduction region 71b such as carbon monoxide and the remaining portion of the flammable volatile component which have not been used for the combustion flows to the liquid-tar separating device 105 via the second exhaust pipe 52 and the first exhaust pipe 51, the tar component in the exhaust gases 91, 92, and 93 are separated by the liquid-tar separating device 105 as the liquid tar 161, and the tar-component-processed exhaust gas 94 is fed to the wind boxes 33a to 33e via the gas delivery pipe 53, the pump 56, the circulating gas delivery pipe 58, and the first to fifth branch circulating gas delivery pipes 59a to 59e. Note that the atmosphere temperature is adjusted to about 1300° C. in the reduction region 71b.

With reference to FIG. 3, descriptions are given of an example of a temperature change at positions away from a bottom surface of the raw-material pellet packed bed in a bed height direction thereof in the partially-reduced iron producing apparatus having the configuration described above, the temperature change observed when the raw-material pellets are packed at the height of 200 mm in the reduction furnace and are heated while the mixed gas of the circulated gas and air is vented upward from the wind boxes below the raw-material pellets. In FIG. 3, the solid line shows a temperature history at a position away from the bottom surface of the packed bed by 50 mm, the dotted line shows a temperature history at a position away from the bottom surface of the packed bed by 100 mm, and the one-dot chain line shows a temperature history at a position away from the bottom surface of the packed bed by 150 mm. Note that the oxygen concentration in the first wind box is adjusted to 15% and the oxygen concentration in each of the second to fifth wind boxes is adjusted to 11%.

As shown in FIG. 3, it is found that temperatures which are equal to or above 1200° C. and which are equal to or below 1400° C. are obtained at all of the positions away from the bottom surface of the raw-material pellet packed bed respectively by 50 mm, 100 mm, and 150 mm, i.e. across the entire bed height of the raw-material pellet packed bed, the temperature equal to or above 1200° C. required for the reduction of the raw-material pellets, the temperature equal to or below 1400° C. preventing excessive melting.

The temperatures at the positions away from the bottom surface of the raw-material pellet packed bed by 50 mm, 100 mm, and 150 mm reach their peaks sequentially along with the elapse of time. Hence, it is found that the combustion zone moves in the bed height direction of the raw-material pellet packed bed. Moreover, it is found that the raw-material pellets after the gas combustion are quickly cooled in few minutes from the peak temperature to a temperature equal to or below 500° C. at which reoxidation is less likely to occur.

Accordingly, in the reduction region 71b described above, the heating of the raw-material pellets 3, the generation and combustion of the flammable volatile component, the generation of carbon monoxide gas, the combustion of carbon monoxide gas by the circulation of the carbon monoxide gas and the remaining portion of the flammable volatile component, and the reduction reaction of iron oxide sequentially occur from the bottom surface of the raw-material pellet packed bed 4 to an upper layer thereof, while the grate 101 rotates between the position above the second wind box 33b and the position above the fourth wind box 33d.

Next, the grate 101 moves forward and the mixed gas 95e whose oxygen concentration is adjusted to be 5% or lower is vented into the fifth wind box 33e. This causes the raw-material pellet packed bed 4 whose reduction has proceeded to a predetermined degree to be cooled to about 100° C. to 800° C. in the raw-material pellet cooling region 71c above the fifth wind box 33e and the desired partially-reduced iron is produced. When the grate 101 further moves forward, the partially-reduced iron 5 is discharged from the partially-reduced iron discharging device 39.

Description is given of processing of the tar component in the exhaust gas in the partially-reduced iron producing apparatus having the configuration described above.

The tar component in the ignition raw-material pellets 1 and the raw-material pellets 3 is about 20% of a coal volatile component and is totally volatilized and discharged from the ignition raw-material pellets 1 and the raw-material pellets 3 at a temperature of 400° C. or lower. Since raw-material pellet packed bed 4 is heated to 400° C. or higher from a bottom surface portion to an upper surface portion in the front half of the reduction region 71b in the reduction furnace 30, the tar component in the ignition raw-material pellets 1 and the raw-material pellets 3 are totally discharged in the ignition region 71a and the front half of the reduction region 71b in the reduction furnace 30.

In the start-up of the partially-reduced iron producing apparatus, first, the heat-retaining heaters heat the tower main body 111 of the first gas cooling tower 110A, the tower main body 111 of the second gas cooling tower 110B, the liquid-tar storage tank 115, the liquid-tar circulation pipe 121, the liquid-tar feed pipe 123, the liquid-tar ejection pipe 124, the liquid-tar communication pipe 118, and the liquid tar in the liquid-tar storage tank 115 to a predetermined temperature to secure the flowability of the liquid tar 161. This can prevent clogging of the piping by the liquid tar 161.

Next, the on-off valve V42 is set to the open state while the heater switching valve V61 and the cooler switching valve V62 are set to the closed state. The circulation pump 122 is driven to feed the liquid tar 161 in the liquid-tar storage tank 115 to the liquid-tar ejection pipe 124 via the in-tank liquid-tar feed pipe 116, the liquid-tar circulation pipe 121, and the liquid-tar feed pipe 123. The liquid tar 161 is ejected into the tower main body 111 of the first gas cooling tower 110A and the tower main body 111 of the second gas cooling tower 110B from the liquid-tar ejection pipe 124. The liquid tar 161 is thus accumulated in the tower main body 111 of the first gas cooling tower 110A and the tower main body 111 of the second gas cooling tower 110B.

Then, when a predetermined amount of the liquid tar 161 is accumulated in each of the tower main body 111 of the first gas cooling tower 110A and the tower main body 111 of the second gas cooling tower 110B, the on-off valve V42 is set to the closed state to stop the supply of the liquid tar 161 from the liquid-tar storage tank 115 to the gas cooling towers 110A, 110B. Meanwhile, the heater switching valve V61 is set to the open state, the heater 126 heats the liquid tar 161 to a predetermined temperature (for example, 80° C. to 120° C.), and the liquid tar 161 heated by the heater 126 thus circulates through the liquid-tar circulation pipe 121, the first liquid-tar branch pipe 125, the circulation pump 122, the liquid-tar feed pipe 123, the liquid-tar ejection pipe 124, and the tower main body 111 of the first gas cooling tower 110A. The liquid tar 161 ejected into the tower main body 111 of the second gas cooling tower 110B from the liquid-tar ejection pipe 124 is fed to the tower main body 111 of the first gas cooling tower 110A via the liquid-tar communication pipe 118.

After the circulating liquid tar 161 reaches a predetermined temperature, the reduction furnace 30 is activated and the high-temperature (for example, 240° C.) exhaust gas 91 discharged from the ignition region 71a and the reduction region 71b of the reduction furnace 30 is sent to the first gas cooling tower 110A of the liquid-tar separating device 105. The heater switching valve V61 is set to the closed state while the cooler switching valve V62 is set to the open state. The liquid tar 161 is thus made to flow through the cooler 128 and is cooled to a predetermined temperature (for example, 80° C. to 150° C.). Due to this, the exhaust gas 91 is cooled to, for example, 150° C. to 180° by being processed in the first gas cooling tower 110A and becomes the first-cooled exhaust gas 92 while the first-cooled exhaust gas 92 is cooled to, for example, 130° C. to 150° C. by being processed in the second gas cooling tower 110B and becomes the second-cooled exhaust gas 93. Since the temperatures of the first-cooled exhaust gas 92 and the second-cooled exhaust gas 93 are higher than the acid dew point (about 110° C.), acid corrosion in the first-cooled exhaust gas delivery pipe 117, the communication pipe 119, and the like can be prevented. Moreover, the temperature of the tar-component-processed exhaust gas 94 processed by the mist-form tar separating device 130 is also about 130° C. to 150° C. and the acid corrosion in the gas delivery pipe 53 can be also prevented.

The liquid level of the liquid tar 161 in the tower main body 111 of the first gas cooling tower 110A and the liquid level of the liquid tar 161 in the tower main body 111 of the second gas cooling tower 110B are measured by the aforementioned liquid level sensor and the open and close state of the on-off valve V41 is adjusted according to a measurement value obtained by the liquid level sensor. Specifically, when the liquid tar 161 accumulates in the tower main body 111 of the first gas cooling tower 110A and the tower main body 111 of the second gas cooling tower 110B, the on-off valve V41 is set to the open state on the basis of the signal from the liquid level sensor and the liquid tar 161 is discharged to the liquid-tar storage tank 115. Meanwhile, when the liquid level sensor detects that the measurement value is at the lower limit level, the on-off valve V41 is set to the closed state and the discharge of the liquid tar 161 to the liquid-tar storage tank 115 is stopped.

The exhaust gas is cooled to 150° C. by the first gas cooling tower 110A and the second gas cooling tower 110B and the tar component in the exhaust gases 91, 92 is condensed as the liquid tar 161. The condensed liquid tar 161 is then collected together with the liquid tar 161 ejected from the liquid-tar ejection pipe 124 and particles in fume of the tar passing through the second gas cooling tower 110B which are about several micro meters or larger are collected by the mist-form tar separating device 130 on a downstream side. The tar component not collected by the mist-form tar separating device 130 and not condensed at 150° C. is circulated in a fume or gaseous form and is combusted upon passing through a high-temperature combustion zone of the raw-material pellet packed bed 4 in the reduction furnace 30. The combustion of tar in the raw-material pellet packed bed 4 is performed also in the cooling region 71c. Since the uppermost portion of the raw-material pellet packed bed 4 is 800° C. or higher even at the time when the reduced iron 5 is discharged, the gas 95e introduced into the wind box 33e in the cooling region 71c can be combusted and detoxified by setting the oxygen concentration thereof to about 10% which is required for the combustion of the gas 9e.

As described above, in the partially-reduced iron producing apparatus of the embodiment, the raw-material pellet packed bed is heated by the combustion heat of the ignition raw-material pellets, the flammable volatile component is thereby generated from the reduction coal material in the raw-material pellets and is combusted, and the temperature of the raw-material pellets is further increased by the combustion of the flammable volatile component. As a result, the reduction reaction proceeds and the carbon monoxide gas is thereby generated. Meanwhile the adjacent raw-material pellets are heated and the flammable volatile component is generated from the reduction coal material in the adjacent raw-material pellets. The oxygen containing gas made by circulating the remaining portion of the flammable volatile component and the carbon monoxide gas and mixing the component and gas with air is supplied to the raw-material pellets whose temperature is further increased. This increases the concentration of the carbon monoxide gas around the raw-material pellets to a level within the combustion range of the carbon monoxide gas. Then, the carbon monoxide gas is combusted and the temperature is increased, thereby forming the combustion zone of a temperature required for the reduction of the reduced iron. The combustion zone sequentially proceeds in the bed height direction of the raw-material pellet packed bed in a period from the supply of the raw-material pellets onto the ignition raw-material pellets to the discharge of the raw-material pellets. The raw-material pellet packed bed is thus heated and reduced and the partially-reduced iron can be thereby produced. Accordingly, the raw-material pellets require no coal material coating which serves as a heat source. In other words, the reduction-generated carbon monoxide gas, which has been conventionally discharged into the exhaust gas and emitted into the atmosphere as it is or which has been conventionally combusted outside the system by using a supplemental fuel to recover exhaust heat therefrom with a boiler, is circulated to the raw-material pellet packed bed 4 and added to the carbon monoxide gas generated by the reduction. Thus, the carbon monoxide gas is combusted with the concentration thereof being increased. The rate of combustion is thereby increased and the carbon monoxide gas can be directly effectively used as the heat source in the raw-material pellet packed bed 4. Hence, the combustion coal material conventionally coated on the raw-material pellets is unnecessary. As a result, the amount of coal used in the entire partially-reduced iron producing process (apparatus) can be reduced. This can reduce the consumption of coal material and reduce the carbon dioxide emissions.

Moreover, since the raw-material pellets 3 are heated by the combustion of gas generated by heating the raw-material pellets 3, the amount of generated gas is small and the combustion of the carbon monoxide gas ends as soon as the concentration of the carbon monoxide gas falls below the combustion range of the carbon monoxide in the combustion zone in the raw-material pellet packed bed 4. The raw-material pellets 3 are thereby cooled and are in contact with oxygen in a high-temperature state for only a short time. Hence, it is possible to reduce reoxidation and produce partially-reduced iron with a high degree of metallization.

In conventional raw-material pellets coated with combustion coal powder, the amount of coal in the combustion coal powder is about 5% of the total. As described above, using the raw-material pellets coated with no ignition coal can reduced the amount of used coal compared to that in the conventional method of producing the reduction iron.

The partially-reduced iron producing apparatus includes: the partition boards 38a and 38b provided in the hood 34, surrounded by the hood 34 and grate 101, and defining the space (region 71b) in the center portion in the longitudinal direction of the grate; the exhaust gas circulating device 50 configured to discharge the exhaust gas in the region 71b and supply the exhaust gas to the wind boxes 33b to 33d arranged to face the region 71b; the air supplying device 60 connected to the exhaust gas circulating device 50 and configured to supply air; and the flow rate adjusting valves V11 to V14 provided in the air supplying device 60 and configured to adjust the flow rate of air. This configuration makes it is possible to effectively use the carbon monoxide gas of a relatively high concentration which is generated in the regions 71a and 71b and to thereby suppress carbon dioxide emissions.

Moreover, since the aforementioned liquid-tar separating device 105 is provided in an intermediate portion of the exhaust gas circulating device 50, it is possible to separate the liquid tar from the exhaust gas and use the liquid tar as the burner fuel. In other words, the tar component in the exhaust gas can be effectively used. As a result, the heat energy loss can be reduced.

Other Embodiments

The description has been given above by using the partially-reduced iron producing apparatus including the grate reduction furnace 100 of the up-draft type. However, the partially-reduced iron producing apparatus may include a grate reduction furnace of a down-draft type in which the raw-material pellet supplying device and the heating furnace are arranged in this order from upstream in the travelling direction of the grate.

The description has been given above by using the partially-reduced iron producing apparatus including the liquid-tar separating device 105 having the first gas cooling tower 110A, the second gas cooling tower 110B, and the mist-form tar separating device 130. However, the partially-reduced iron producing apparatus may include a liquid-tar separating device having not two but one or three or more gas cooling towers. Moreover, the partially-reduced iron producing apparatus may include a liquid-tar separating device having only the two gas cooling towers.

The description has been given above by using the partially-reduced iron producing apparatus including the liquid-tar storage tank 115. However, the liquid-tar storage tank 115 may be removed from the partially-reduced iron producing apparatus.

The description has been given above by using the partially-reduced iron producing apparatus including the liquid-tar supplying device 140 configured to supply the liquid tar 161 to the combustion burner 21. However, the liquid-tar supplying device 140 can be removed from the partially-reduced iron producing apparatus.

Industrial Application

In the partially-reduced iron producing apparatus of the present invention, the partially-reduced iron can be produced without using a combustion coal material. Moreover, the tar component in the exhaust gas can be effectively used to suppress the heat energy loss. Accordingly, the partially-reduced iron producing apparatus can be effectively used in the steel industry and the like.

REFERENCE SIGNS LIST

1 IGNITION RAW-MATERIAL PELLET
2 IGNITION RAW-MATERIAL PELLET BED
3 RAW-MATERIAL PELLET
4 RAW-MATERIAL PELLET PACKED BED
5 PARTIALLY-REDUCED IRON
10 IGNITION RAW-MATERIAL PELLET SUPPLYING DEVICE
20 HEATING FURNACE
21 COMBUSTION BURNER
22 EXHAUST PIPE
23 COOLING REGION GAS EXHAUST PIPE
30 REDUCTION FURNACE
31 RAW-MATERIAL PELLET SUPPLYING DEVICE (FEED HOPPER)
32 REDUCTION FURNACE MAIN BODY
33a TO 33e WIND BOX
34 HOOD
35 TRACK
36 SUPPORTING PORTION
37 ROLLER
38a, 38b PARTITION BOARD
41, 43 WATER SEAL BOX
42, 44 SEAL PLATE
51 FIRST EXHAUST PIPE
52 SECOND EXHAUST PIPE
53 GAS DELIVERY PIPE
56 PUMP
57 $O_2$ SENSOR
58 CIRCULATING GAS DELIVERY PIPE
59a TO 59e FIRST TO FIFTH BRANCH CIRCULATING GAS DELIVERY PIPES
60 AIR SUPPLYING DEVICE
61 AIR SUPPLYING SOURCE
62 AIR FEED PIPE
63 FLOW RATE ADJUSTING VALVE
64 PUMP
65 AIR DELIVERY PIPE
66a TO 66e FIRST TO FIFTH BRANCH AIR DELIVERY PIPES
71a IGNITION REGION
71b REDUCTION REGION
71c COOLING REGION
100 GRATE REDUCTION FURNACE
101 ENDLESS GRATE
105 LIQUID-TAR SEPARATING DEVICE
110A, 110B GAS COOLING TOWER
111 TOWER MAIN BODY
112 TAR-COMPONENT CONDENSATION PROMOTING UNIT
113 LIQUID-TAR DISCHARGE PIPE
114 LIQUID-TAR DISCHARGE PIPE
115 LIQUID-TAR STORAGE TANK
116 IN-TANK LIQUID-TAR FEED PIPE
117 FIRST-COOLED EXHAUST GAS DELIVERY PIPE
118 LIQUID-TAR COMMUNICATION PIPE
119 COMMUNICATION PIPE
121 LIQUID-TAR CIRCULATION PIPE
122 CIRCULATION PUMP
123 LIQUID-TAR FEED PIPE
124 LIQUID-TAR EJECTION PIPE
125 FIRST LIQUID-TAR BRANCH PIPE
126 HEATER
127 SECOND LIQUID-TAR BRANCH PIPE
128 COOLER
130 MIST-FORM TAR SEPARATING DEVICE
131 DEVICE MAIN BODY
132 LIQUID-TAR DISCHARGE PIPE
140 LIQUID-TAR SUPPLYING DEVICE
141 LIQUID-TAR SUPPLYING PIPE
142 LIQUID-TAR SUPPLYING PUMP
150 BURNER FUEL SUPPLYING DEVICE
151 BURNER FUEL SUPPLYING SOURCE
152 BURNER FUEL SUPPLYING PIPE
153 BURNER FUEL
161 LIQUID TAR
V21 VALVE
V22 FLOW RATE ADJUSTING VALVE
V31, V41, V42, V51 ON-OFF VALVE
V61 HEATER SWITCHING VALVE
V62 COOLER SWITCHING VALVE

The invention claimed is:

1. A partially-reduced iron producing apparatus comprising:
an ignition raw-material pellet supplying device that lays ignition raw-material pellets to a predetermined height on an endless grate, the ignition raw-material pellets made of the same material as that of raw-material pellets formed by mixing and pelletizing a reduction carbon material and a raw material containing iron oxide;
a heating furnace that heats the ignition raw-material pellets laid on the endless grate to a reduction temperature range;
a reduction furnace that produces a partially-reduced iron, the reduction furnace including a raw-material pellet supplying devices that lays the raw-material pellets on the ignition raw-material pellets heated by the heating furnace;
and exhaust gas circulating device that supplies an oxygen-containing gas to the raw-material pellets to be heated by a heat of the ignition raw-material pellets, the oxygen-containing gas made by circulating part of an exhaust gas discharged from the raw-material pellets by use of the heat of the ignition raw-material pellets and mixing the discharged exhaust gas with air; and
a liquid-tar separating device, provided in the exhaust gas circulating device, that separates a tar component in the exhaust gas from the exhaust gas as a liquid tar, wherein
the partially-reduced iron is produced by heating and reducing the whole of the raw-material pellets in a bed height direction thereof through a combustion region for the raw-material pellets and a heating region for the raw-material pellets, the combustion region formed on an upstream side in a travelling direction of the endless grate by supplying the oxygen-containing gas having a high oxygen concentration to the ignition raw-material pellets heated by the heating furnace, the heating region formed downstream of the combustion region for the raw-material pellets in the travelling direction of the endless grate by supplying the oxygen-containing gas having a low oxygen concentration to the raw-material pellets.

2. The partially-reduced iron producing apparatus according to claim 1, wherein
the liquid-tar separating device has gas-liquid separating means for separating the liquid tar from the exhaust gas by cooling the exhaust gas to condense the tar component in the exhaust gas, and
the gas-liquid separating means includes: a tower main body into which the exhaust gas flows; a liquid-tar ejecting device that ejects the liquid tar, in the tower main body; and a liquid-tar feeding device that collects liquid tar which is ejected from the liquid-tar ejecting device and liquid tar which is condensed from the tar component in the exhaust gas by the liquid tar ejected from the liquid-tar ejecting device, and feeding the liquid tar to the liquid tar ejecting device.

3. The partially-reduced iron producing apparatus according to claim 2, wherein
the gas-liquid separating means further includes a temperature adjusting device, provided in the liquid-tar feeding device, that adjusts the temperature of the liquid tar.

4. The partially-reduced iron producing apparatus according to claim 2, wherein
two of the gas-liquid separating means are provided, and
one of the gas-liquid separating means and the other gas-liquid separating means are arranged in series.

5. The partially-reduced iron producing apparatus according to claim 4, wherein the liquid-tar separating device further includes a mist-form tar separating device, provided in a stage subsequent to the gas-liquid separating means, that separates a mist-form tar in the exhaust gas from the exhaust gas.

6. The partially-reduced iron producing apparatus according to claim 5, further comprising:
a liquid-tar storing tank, provided to be connected to the liquid-tar separating device, that stores the liquid tar separated by the liquid-tar separating device; and
a liquid-tar supplying device that supplies the liquid tar stored in the liquid-tar storing tank to the heating furnace.

* * * * *